United States Patent
Bae (10) Patent No.: US 9,137,411 B2
(45) Date of Patent: Sep. 15, 2015

(54) IMAGE FORMING APPARATUS AND METHOD OF INPUTTING E-MAIL THEREAT

(75) Inventor: Sung-Hwan Bae, Busan (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 54 days.

(21) Appl. No.: 13/589,360

(22) Filed: Aug. 20, 2012

(65) Prior Publication Data

US 2013/0063773 A1 Mar. 14, 2013

(30) Foreign Application Priority Data

Sep. 9, 2011 (KR) .................. 10-2011-0092223

(51) Int. Cl.
*G06F 15/02* (2006.01)
*H04N 1/00* (2006.01)
*G06Q 10/10* (2012.01)
*H04N 1/23* (2006.01)
*H04N 1/44* (2006.01)

(52) U.S. Cl.
CPC ......... *H04N 1/00973* (2013.01); *G06Q 10/107* (2013.01); *H04N 1/00225* (2013.01); *H04N 1/00244* (2013.01); *H04N 1/2307* (2013.01); *H04N 1/4413* (2013.01); *H04N 1/4433* (2013.01); *H04N 2201/0094* (2013.01)

(58) Field of Classification Search
CPC ......... H04N 1/00204; H04N 1/00209; H04N 1/00212; H04N 1/00222; H04N 1/00225; H04N 1/00244; H04N 1/32064; H04N 1/32069

USPC .................. 358/1.15, 1.16, 402, 440, 444
See application file for complete search history.

(56) References Cited

U.S. PATENT DOCUMENTS

| | | | |
|---|---|---|---|
| 6,829,607 B1 * | 12/2004 | Tafoya et al. ................... | 1/1 |
| 7,216,070 B2 * | 5/2007 | Kitada et al. ................... | 703/6 |
| 2004/0024811 A1 | 2/2004 | Kitada et al. | |
| 2004/0186848 A1 | 9/2004 | Kobashikawa et al. | |
| 2010/0299396 A1 * | 11/2010 | Memon et al. ............. | 709/206 |
| 2011/0081949 A1 | 4/2011 | Natarajan et al. | |

FOREIGN PATENT DOCUMENTS

| | | | |
|---|---|---|---|
| GB | 2 382 688 A | | 6/2003 |
| JP | 2001345991 A | * | 12/2001 |
| JP | 2009-20785 | | 1/2009 |
| JP | 2011-30085 | | 2/2011 |

OTHER PUBLICATIONS

"User's Guide, Network Setup and Scanner Operations", 2004, pp. 127-135.

(Continued)

*Primary Examiner* — Thomas D Lee
(74) *Attorney, Agent, or Firm* — Staas & Halsey LLP (57) ABSTRACT

A method of inputting e-mail addresses at an image forming apparatus, the method including accessing a server storing member information about members who have contacted a user online, by using log-in information of the user; receiving the member information stored in the server from the server; generating a list of e-mail addresses of the members by using the received member information; and updating an address book stored in the image forming apparatus by using the list of generated e-mail addresses.

18 Claims, 10 Drawing Sheets

(56) References Cited

OTHER PUBLICATIONS

European Search Report dated Jan. 7, 2013 in corresponding European Patent Application 12179931.6.

Communication from European Patent Office dated Jan. 22, 2014 issued in corresponding European Patent Application 12 179 931.6-1955.

* cited by examiner

```
{
    "data": [
      {
        "name": "₩ud64d₩uba85₩ub355",
        "id": 100000245214521
      },
      {
        "name": "₩ud64d₩uba85₩ub355",
        "id": 100000245214521
      }
    ...
}
```

FIG. 8B

```
{
"id": "100000482185025",
"name": "₩ud64d₩uba85₩ub355",
"first_name": "₩uba85₩ub355",
"last_name": "₩ud64d"
"link": http://www.facebook.com/profile.php?id=100000482185025",
……,
"email": bigboy@google.com
…..
}
```

FIG. 10

| UserID | Nicname | Email Address | Recent Data | Favorite |
|---|---|---|---|---|
| Kellycotton | Kelly Sister | kellyclotton@gogle.com | 2011-07-09T03:26:01Z | N/A |
| Radygaga | Gaga Sister | ladygaga@gogle.com | 2011-08-27T 09:07:03Z | OK |
| ⋮ | ⋮ | ⋮ | ⋮ | ⋮ |

IMAGE FORMING APPARATUS AND METHOD OF INPUTTING E-MAIL THEREAT

CROSS-REFERENCE TO RELATED APPLICATIONS

This application claims the priority benefit of Korean Patent Application No. 10-2011-0092223, filed on Sep. 9, 2011, in the Korean Intellectual Property Office, the disclosure of which is incorporated herein in its entirety by reference.

BACKGROUND

1. Field

One or more embodiments of the following description relate to an image forming apparatus and a method of inputting e-mails thereat.

2. Description of the Related Art

Image forming apparatuses include office automation apparatuses (e.g., multi-function product (MFP)), which are single apparatuses capable of performing a plurality of functions used at an office, such as printing, photocopying, scanning, faxing, etc. An MFP may perform individual functions of various apparatuses, such as a printer, a scanner, a photocopier, and a facsimile, or perform a combination of functions thereof. Recently, image forming apparatuses having a network function to communicate with other terminals, such as a PC, are becoming popular.

SUMMARY

Additional aspects and/or advantages will be set forth in part in the description which follows and, in part, will be apparent from the description, or may be learned by practice of the invention.

One or more embodiments provide an image forming apparatus and a method of inputting e-mails thereat.

According to an aspect of one or more embodiments, there is provided a method of inputting e-mail addresses at an image forming apparatus, the method including accessing a server storing member information about members who have contacted a user online, by using log-in information of the user; receiving the member information stored in the server from the server; generating a list of e-mail addresses of the members by using the received member information; and updating an address book stored in the image forming apparatus by using the list of generated e-mail addresses.

According to another aspect of one or more embodiments, there is provided at least one non-transitory computer readable medium storing computer readable instructions to implement methods of one or more embodiments According to another aspect of one or more embodiments, there is provided an image forming apparatus including a network interface unit that accesses a server storing member information about members who have contacted a user online by using log-in information of the user and receives the member information stored in the server from the server; a list generating unit that generates a list of e-mail addresses of the members by using the received member information; and an updating unit that updates an address book stored in the image forming apparatus by using the list of generated e-mail address.

BRIEF DESCRIPTION OF THE DRAWINGS

The above and other features and advantages will become more apparent by describing in detail one or more embodiments thereof with reference to the attached drawings in which.

DETAILED DESCRIPTION

As used herein, the term "and/or" includes any and all combinations of one or more of the associated listed items.

Hereinafter, one or more embodiments will be described in detail with reference to the attached drawings.

Figure 1:
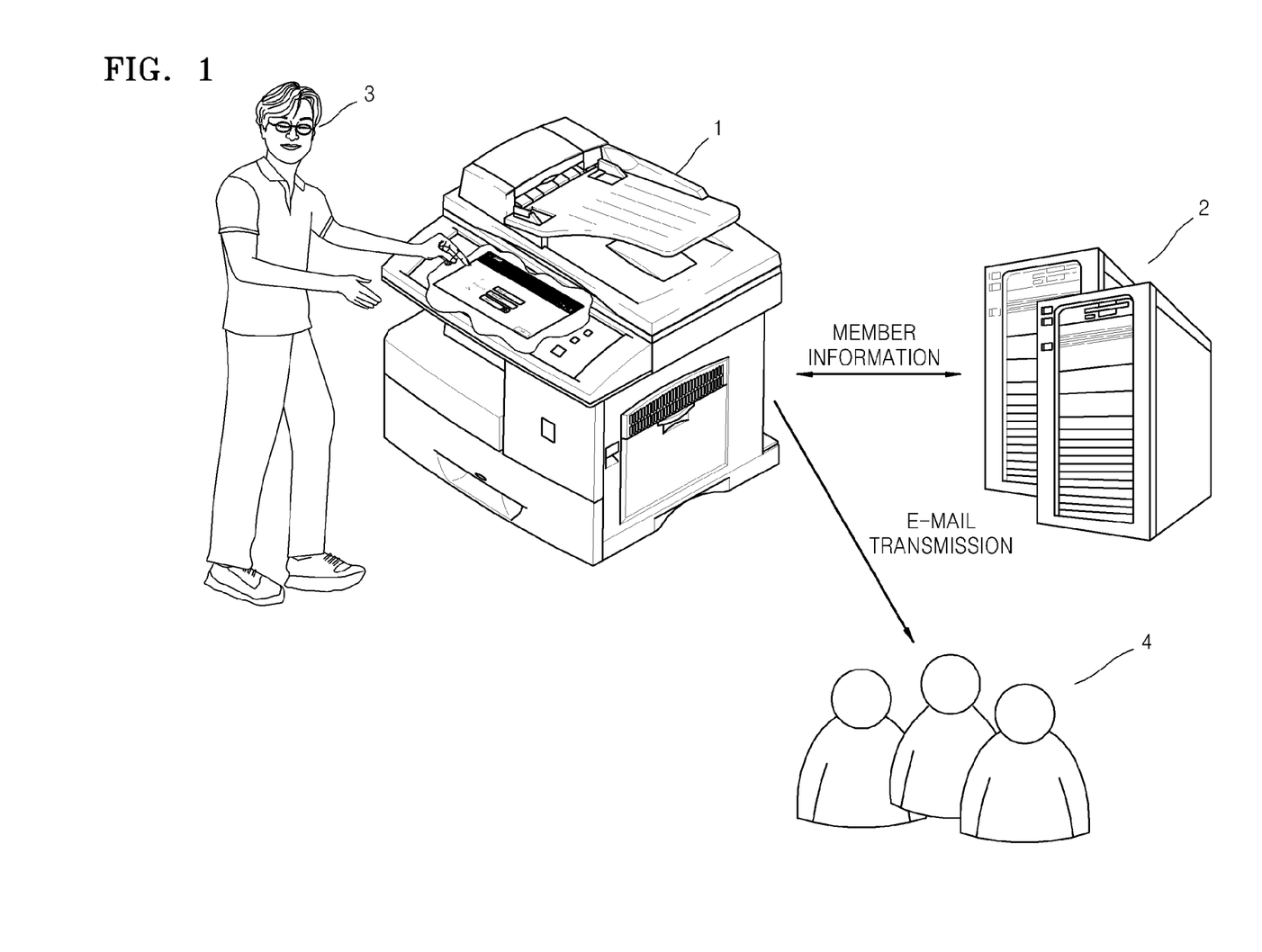
FIG. 1 is a block diagram of an image forming system including an image forming apparatus according to an embodiment.

FIG. 1 is a block diagram of an image forming system including an image forming apparatus 1 according to an embodiment. Referring to FIG. 1, the image forming apparatus 1 and a server 2 are shown. To prevent the subject matter of an embodiment from being obscured, only hardware components related to an embodiment are shown in FIG. 1. However, one of ordinary skill in the art will understand that universal hardware components other than the hardware components shown in FIG. 1 may further be employed.

The image forming apparatus 1 refers to an apparatus that is connected to a host apparatus (not shown) and transfers and prints image signals onto a printing medium (e.g., printing paper) according to digital signals input by the host apparatus. The image forming apparatus 1 may be a printer, a scanner, a multi-function product (MFP), etc. Particularly, an MFP refers to an office automation apparatus capable of simultaneously performing functions of various apparatuses, such as a printer, a photocopier, a scanner, and a facsimile. An MFP may perform individual functions of various apparatuses, such as a printer, a scanner, a photocopier, and a facsimile, or perform those in combination of functions thereof.

Recently, an MFP capable of solely performing a Scan-To-Email function, which includes scanning a document by using a scanning function of the MFP, attaching the scanned image to an e-mail, and transmitting the e-mail to a desired user via a wired, wireless, or hybrid network, has been introduced. Here, one of ordinary skill in the art will understand that the term "Scan-To-Email" may be replaced with other terms having the same definition.

In the related art, when transmitting a scanned image to members 4 by using the Scan-To-Email function of the image forming apparatus 1, it is generally necessary to input every character of e-mail addresses of the members 4 by using a user interface (UI) of the image forming apparatus 1.

For example, e-mail addresses may be input by using hardware buttons included in the image forming apparatus 1, by using a software keyboard displayed on a graphic user interface (GUI) or a touch screen of the image forming apparatus 1, or by browsing an address book stored in the image forming apparatus 1 in advance.

In detail, when inputting e-mail addresses by using hardware buttons of the image forming apparatus 1, for example, if a number of characters in members 4 is large, a task of inputting of every e-mail address one by one is cumbersome and repetitive. Furthermore, even when using a software keyboard of a GUI or a touch screen of the image forming apparatus 1, for example, it is still necessary to input every e-mail address one by one. Particularly, it is very inconvenient to input e-mail addresses where a size of a corresponding GUI screen is small. Furthermore, even when using an address book stored in the image forming apparatus 1 in advance, a task of adding e-mail addresses to the address book is necessary, and thus it is still necessary to perform a cumbersome and repetitive task as described above.

However, the image forming apparatus 1 according to one or more embodiments directly acquires member information about the members 4 from the server 2 by communicating with the server 2 and extracts e-mail addresses from the received member information. The member information may include, for example, a list of friends stored in the server 2, or e-mail addresses about the members 4, but not limited thereto. Therefore, a cumbersome and repetitive task of inputting e-mail addresses one by one as in the related art may be avoided.

In one or more embodiments, the server 2 refers to a server that provides a social network service (SNS), an e-mail service, and/or a message service, but not limited thereto. For example, the server 2 may correspond to a server that provides an SNS service via a website, such as Facebook (http://www.facebook.com/), Twitter (http://twitter.com), etc. Furthermore, the server 2 may correspond to a server that provides an e-mail service via a website, such as Naver (http://www.naver.com), Google (http://www.google.com), AOL (http://www.aol.com), etc. However, the server 2 is not limited thereto, and the server 2 may include any server that provides an SNS, an e-mail service, and/or a message service, and etc.

The server 2 as described above stores member information about the members 4 with whom a user 3 has exchanged messages or e-mails online. Here, the members 4 includes at least one member. In detail, the server 2 stores information about online personal connections of the user 3 or member information about the members 4 recorded in an e-mail history of the user 3. Here, the term of the personal connections may be called various terms, such as friends or followers, according to types of the server 2, therefore the term of the personal connections are not limited. In other words, the server 2 stores member information about the members 4 who have contacted or communicated with the user 3 online.

In other words, the image forming apparatus 1 according to an embodiment communicates with the server 2 as described above and directly receives information required to acquire e-mail addresses of the members 4. Therefore, the user 3 is not inconvenienced with having to input every character of e-mail addresses one by one as in the related art.

Hereinafter, interactions between each of components of the image forming apparatus 1 according to an embodiment and the server 2 will be described in detail.

Figure 2:
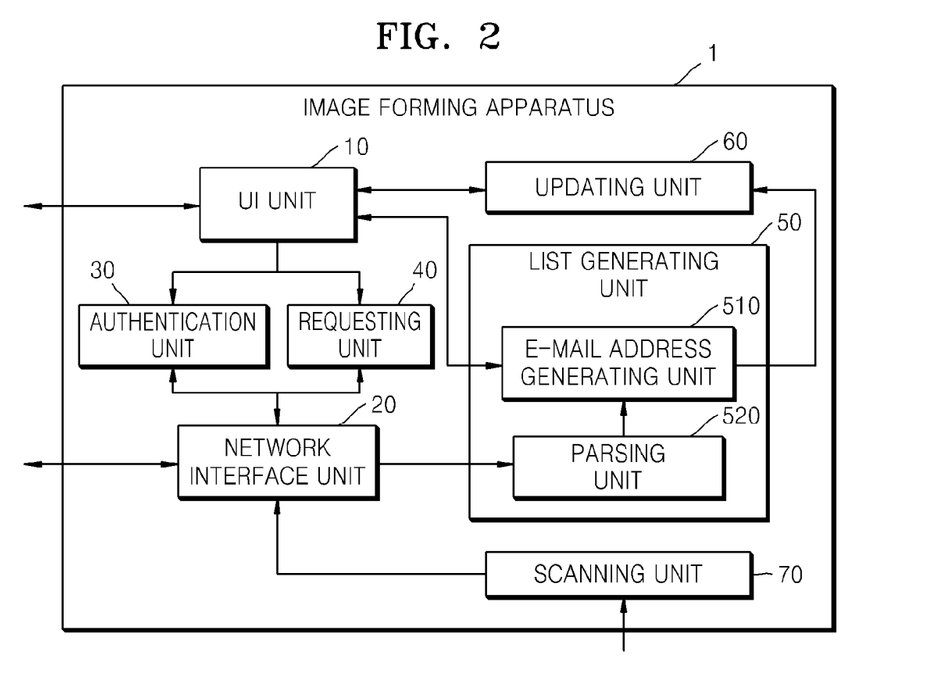
FIG. 2 is a detailed block diagram of the image forming apparatus according to an embodiment.

FIG. 2 is a detailed block diagram of the image forming apparatus 1 according to an embodiment. Referring to FIG. 2, the image forming apparatus 1 includes a User Interface (UI) unit 10, a network interface unit 20, an authentication unit 30, a requesting unit 40, a list generating unit 50, an updating unit 60, and a scanning unit 70. Furthermore, the list generating unit 50 includes a parsing unit 520 and an e-mail address generating unit 510.

Here, the authentication unit 30, the requesting unit 40, the list generating unit 50, and the updating unit 60 may correspond to a processor. Such a processor may be embodied as an array of a plurality of logic gates or a combination of a universal microprocessor and a memory storing programs that may be executed on the microprocessor. Furthermore, one of ordinary skill in the art will understand that such a processor may be embodied as other types of hardware.

To prevent the subject matter of an embodiment from being obscured, only hardware components related to an embodiment are shown in FIG. 2. However, one of ordinary skill in the art will understand that the image forming apparatus 1 may further include universal hardware components other than the hardware components shown in FIG. 1, such as a storage unit (not shown), a printing unit (not shown), etc.

The UI unit 10 receives various information from the user 3 and reports a result of processing the information at the image forming apparatus 1 by displaying the result of processing the information. In other words, the UI unit 10 includes an input unit (not shown) for receiving information from the user 3 and a display unit (not shown) to show a result of processing the received information to the user 3.

The UI unit 10 receives information from the user 3 via an information input device, such as a keyboard, a mouse, hardware buttons, a touch screen (e.g., a software keyboard of a GUI), or a voice recognizing device. Furthermore, the UI unit 10 reports a result of processing received information at the image forming apparatus 1 to the user 3 by using a device for displaying visual data (e.g., an LCD screen, an LED screen, a gradation displaying device, etc.) or a device for providing auditory information (e.g., a speaker).

In detail, the UI unit 10 receives user input of various information necessary to receive e-mail address information from the sever 2. For example, when performing the Scan-To-Email function according to an embodiment, the UI unit 10 may receive e-mail address information from the user 3.

Figure 3:
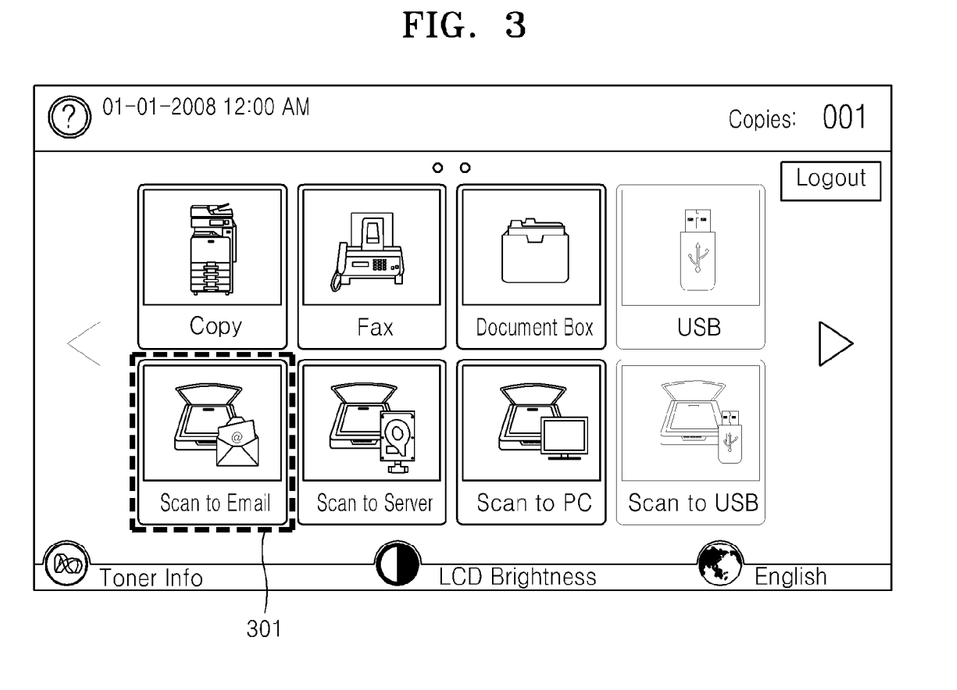
FIG. 3 shows that Scan-To-Email function is activated in an User Interface (UI) unit according to an embodiment.

FIG. 3 shows that the Scan-To-Email function is activated in the UI unit 10 according to an embodiment. Referring to FIG. 3, the UI unit 10 displays information about various functions of the image forming apparatus 1, and the user 3 selects a Scan-To-Email function 301 from among the functions via the UI unit 10. Accordingly, the Scan-To-Email function 301 may be activated.

Figure 4:
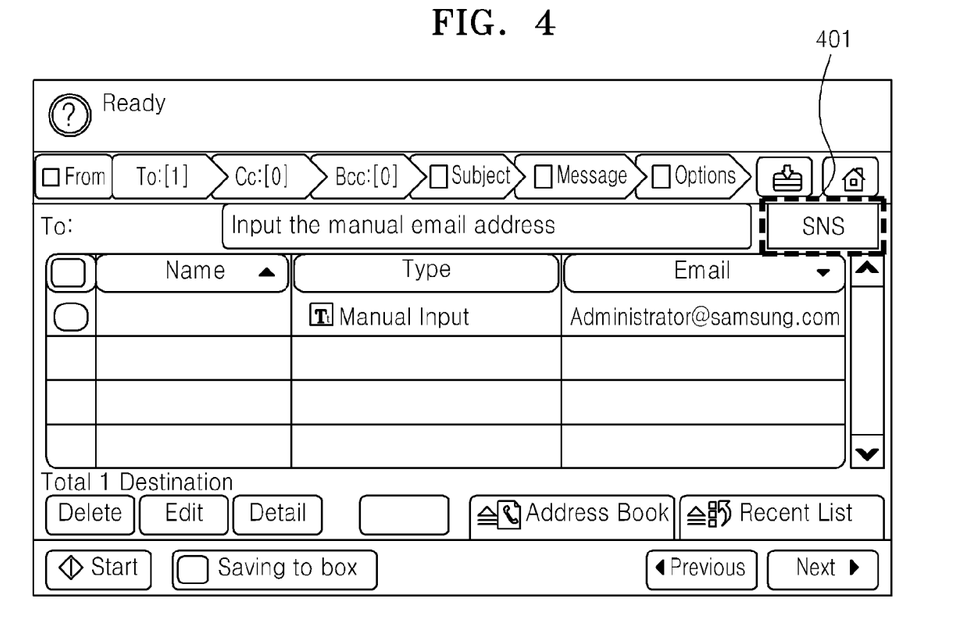
FIG. 4 shows that a button for invoking e-mail addresses stored in a social network service (SNS) server is selected at the image forming apparatus according to an embodiment.

FIG. 4 shows that a button to invoke e-mail addresses stored in a social network service (SNS) server is selected at the image forming apparatus 1 according to an embodiment. Referring to FIG. 4, the UI unit 10 displays an SNS button 401 for the user 3 to select to invoke e-mail addresses from the server 2. In other words, when the Scan-To-Email function 301 is activated as shown in FIG. 3, the user 3 may initiate a process to invoke e-mail addresses from the server 2 providing an SNS service by clicking the SNS button 401 in an e-mail address input screen displayed on the UI unit 10.

Configurations of the screens displayed on the UI unit 10 as shown in FIGS. 3 and 4 are merely examples, and an embodiment is not limited thereto. Furthermore, i where the Scan-To-Email function is initiated as shown in FIG. 3, reception of e-mail address information from the user 3 may be initiated. However, an embodiment is not limited thereto. One of ordinary skill in the art will understand that, if the user 3 only wants to add e-mail address information to an address book, a screen including the SNS button 401 as shown in FIG. 4 may be displayed without the selection of the Scan-To-Email function 301 as shown in FIG. 3, so that the user 3 may start accessing the server 2.

Furthermore, one of ordinary skill in the art will understand that any of various types of buttons or functions to start accessing of the server 2, like the SNS button 401 shown in FIG. 4, may be arranged according to an embodiment.

Referring back to FIG. 1, the UI unit 10 receives selection of the server 2 and log-in information corresponding to the selected server 2 from the user 3. Selection of a type of the server 2 refers to selection of one of servers providing websites, such as Facebook, Twitter, Naver, Daum, and Google, as described above.

Figure 5:
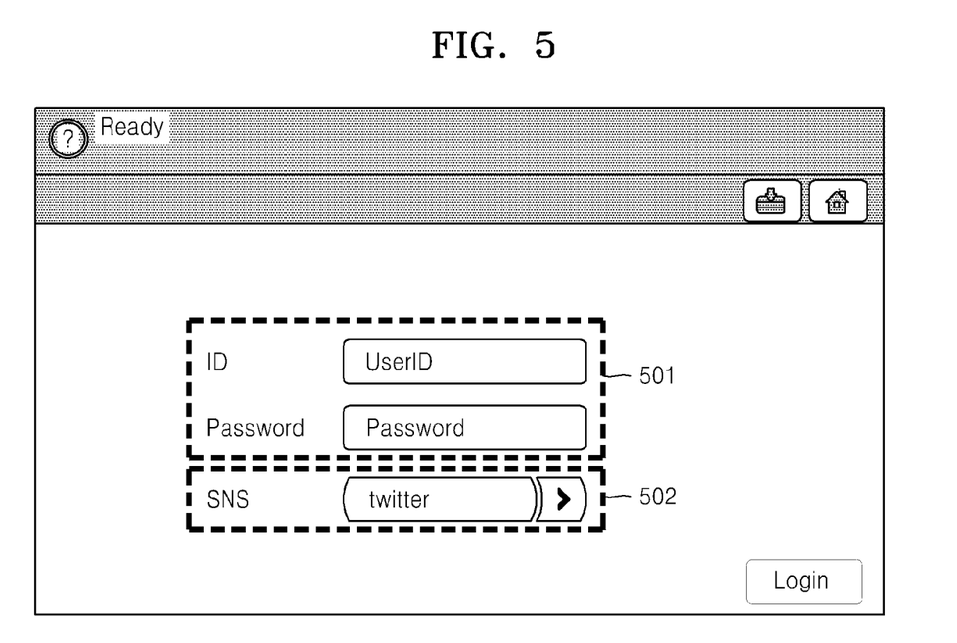
FIG. 5 shows a screen displayed on the UI unit for a user to input a type of a server and log-in information.

FIG. 5 shows a screen displayed on the UI unit 10 for the user 3 to input a type of the server 2 and log-in information. Referring to FIG. 5, the UI unit 10 displays a screen 501 for inputting a user ID and a password of the user 3, that is, log-in information, and a screen 502 for inputting a type of the server 2 providing an SNS. Like that shown in FIGS. 3 and 4, configurations of the screens displayed on the UI unit 10 as shown in FIG. 5 are merely examples, and an embodiment is not limited thereto.

Referring back to FIG. 1, when the user 3 inputs a type of the server 2 and log-in information via the screen displayed on the UI unit 10 as shown in FIG. 5, the network interface unit 20 accesses the selected server 2 by using the input log-in information. However, before the network interface unit 20 accesses the server 2, authentication is performed as described below.

The authentication unit 30 attempts authentication to the server 2 by using the input log-in information. If authentication is successful, the network interface unit 20 accesses the server 2.

Furthermore, when authentication is successful and connection to the server 2 is established, the requesting unit 40 requests member information about the members 4, stored in the connected server 2. As a result of such request, the network interface unit 20 receives member information stored in the server 2.

The authentication unit 30 attempts authentication to the server 2 by using an authentication module that communicates via a protocol corresponding to the type of the server 2 selected by the user 3. Furthermore, the requesting unit 40 requests member information from the server 2 by using an authentication module that communicates via a request protocol corresponding to the type of the server 2 selected by the user 3.

Figure 6:
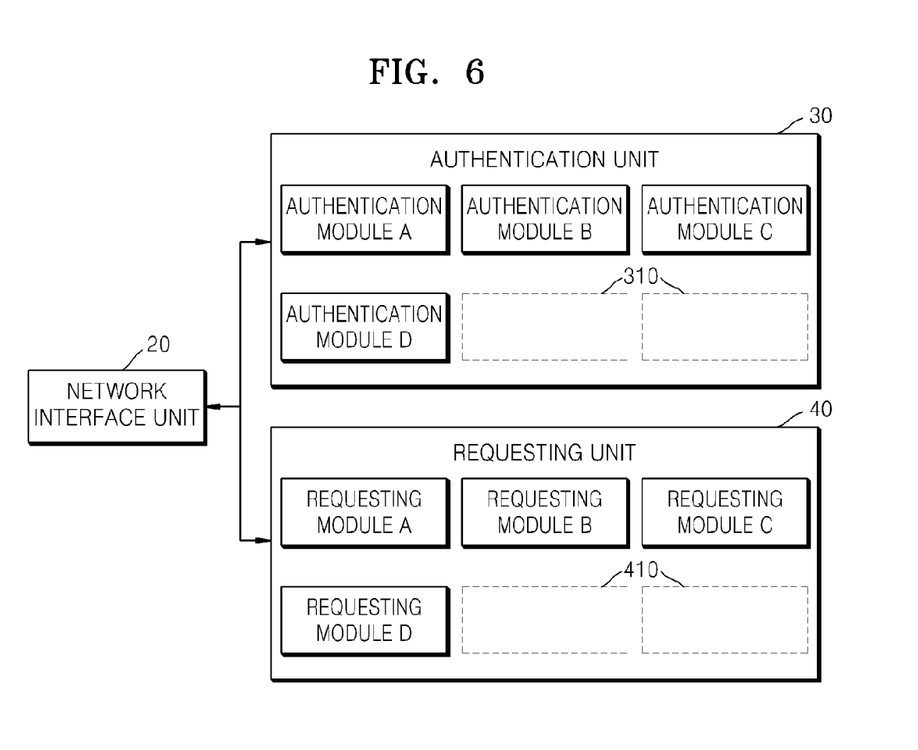
FIG. 6 is a detailed block diagram of an authentication unit and a requesting unit according to an embodiment.

FIG. 6 is a detailed block diagram of the authentication unit 30 and the requesting unit 40 according to an embodiment. Referring to FIG. 6, the authentication unit 30 includes an authentication module A, an authentication module B, an authentication module C, and an authentication module D, whereas the requesting unit 40 includes a request module A, a request module B, a request module C, and a request module D. Here, the authentication modules and the request modules are only examples for convenience of explanation, and numbers of the authentication modules and the request modules may vary.

Each of the authentication modules and each of the request modules correspond to each of types of the server 2. For example, the authentication module A and the request module A may correspond to a server providing an SNS, such as Facebook, whereas the authentication module C and the request module C may correspond to a server providing an e-mail service, such as Naver. Therefore, types of the server 2 that are accessible may vary according to types of authentication modules and request modules included in the authentication unit 30 and the requesting unit 40.

The authentication modules and the request modules may be added by upgrading firmware of the image forming apparatus 1 or via module installation. In other words, a new authentication module may be added to an authentication module installation space 310 of the authentication unit 30, and a new request module may be added to a request module installation space 410 of the requesting unit 40. When a new authentication module and a new request module are added as described above, types of the server 2 that may be selected by a user may increase. On the contrary, if an authentication module and a request module are deleted, types of the server 2 that may be selected by a user may decrease.

The network interface unit 20 provides information to the server 2 by using an authentication module and a request module and receives information transmitted by the server 2. Detailed description thereof will be given below with reference to FIG. 7.

Figure 7:
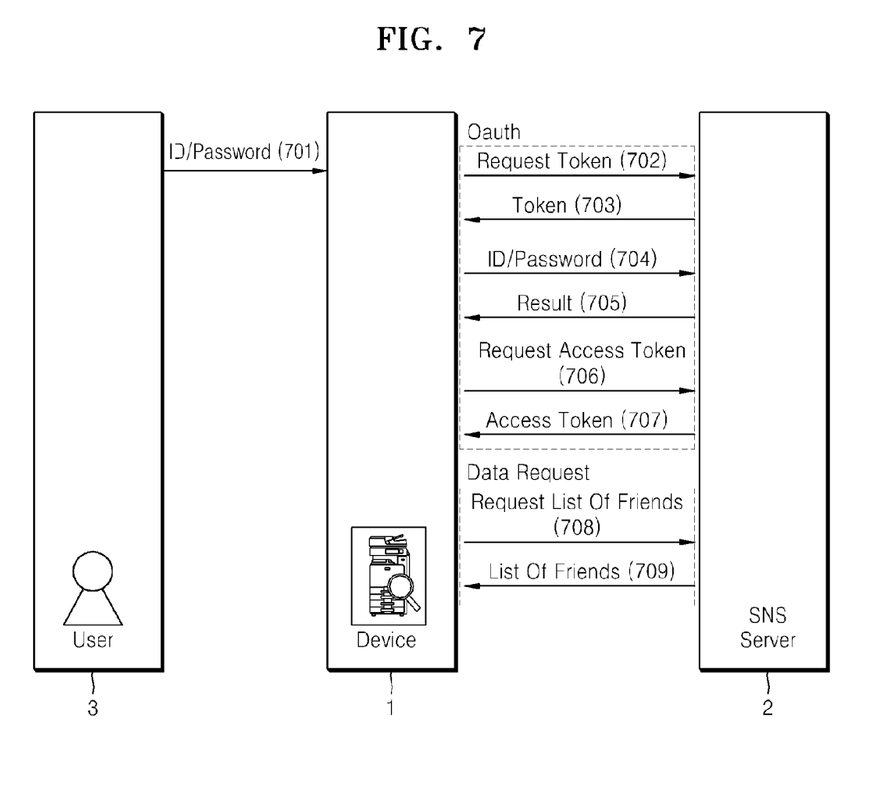
FIG. 7 shows that the authentication unit and the requesting unit according to an embodiment communicate with the server.

FIG. 7 shows that the authentication unit 30 and the requesting unit 40 according to an embodiment communicate with the server 2. The SNS server is used as an example, but the server may be an e-mail server or a message server, and not limited thereto. Referring to FIG. 7, the authentication unit 30 and the requesting unit 40 communicate with the server 2 via the network interface unit 20.

In an operation 701, the UI unit 10 of the image forming apparatus 1 receives log-in information, that is, a user ID and a password from the user 3.

Operations 702 through 707 correspond to operations performed between an authentication module of the authentication unit 30 of the image forming apparatus 1 and the server 2. Here, the authentication module and the server 2 may perform authentication by using open authorization (OAuth), which is a standard authentication method developed based on open application programming interface (Open API). Although definition of an API for authentication to the server 2 and definition of an API to receive member information vary according to a type of the server 2, a representational state transfer (REST) based protocol is generally employed. Therefore, authentication may be performed as shown in the operations 702 through 707 of FIG. 7. However, the authentication shown in the operations 702 through 707 is only an example for convenience of explanation, and one of ordinary skill in the art will understand that methods for authentication according to an embodiment are not limited thereto.

In the operation 702, the authentication module requests a request token from the server 2.

In the operation 703, the server 2 grants the request token to the authentication module.

In the operation 704, as the authentication module transmits the user ID and the password, which are log-in information of the user 3, to the server 2. Here, authentication of the user 3 is performed at the server 2.

In the operation 705, the server 2 sends the result of the authentication of the user 3.

In the operation 706, the authentication module requests an access token.

In the operation 707, the server 2 grants the access token.

As described above, when authentication is successful between the authentication module of the authentication unit 30 and the server 2 through the operations 702 through 707, the authentication module accesses the server 2 by using the granted access token.

Operations 708 through 709 correspond to operations performed between a request module of the requesting unit 40 of the image forming apparatus 1 and the server 2.

In the operation 708, the request module requests member information from the server 2. For example, the member information may correspond to a list of friends stored in the server 2.

In the operation 709, the request module receives member information, such as a list of friends, from the server 2.

As described above, the request module of the requesting unit 40 receives member information about the members 4 who have contacted with the user 3 stored in the server 2, from the server 2.

Figure 8A:
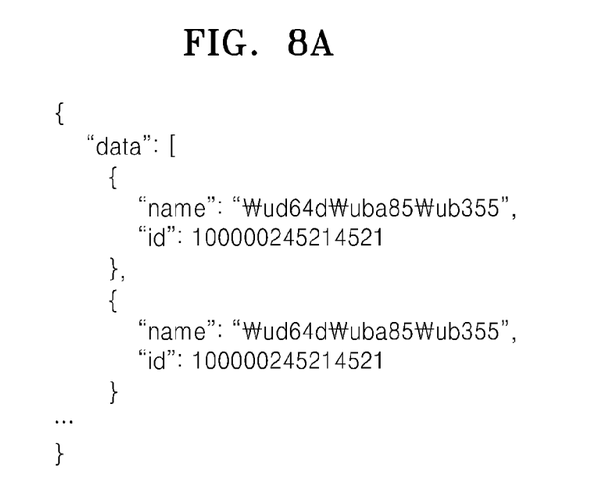
FIGS. 8A and 8B are diagrams showing data received from the server during reception of member information according to an embodiment.
Figure 8B:
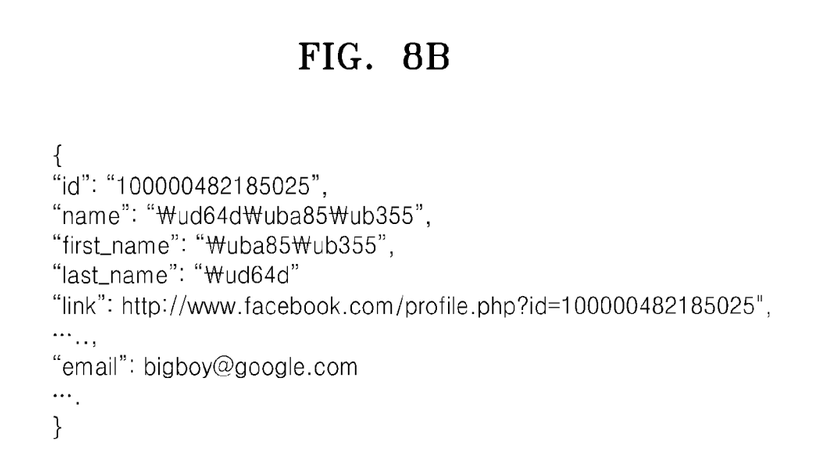

FIGS. 8A and 8B are diagrams showing data received from the server 2 during reception of member information according to an embodiment. FIGS. 8A and 8B show data received by the network interface unit 20 in the operation 709 of FIG. 7. In FIGS. 8A and 8B, for example, the server 2 is a server providing a Facebook website.

The request module sends a request to the server 2 by using a uniform resource locator (URL) "https://graph.facebook.com/[User ID]/friends?access_token=[access token]," for example. The server 2 transmits a response as shown in FIG. 8A to the request module.

Next, based on the result as shown in FIG. 8A, the request module sends a request to the server 2 by using a URL "https://graph.facebook.com/[Friend's User Id]?access_token=[access token]". The server 2 responds by transmitting the result as shown in FIG. 8B to the request module.

Referring to the response as shown in FIG. 8B, information about an e-mail address of a friend, such as "email": "bigboy@google.com", is acquired as a result of the request of the request module. Here, since a user ID of the friend is in the form of an e-mail address in the server providing a Facebook website, e-mail address information may be directly acquired from the user ID of the friend.

In FIGS. 8A and 8B, Facebook is used as an example for convenience of explanation, and one of ordinary skill in the art will understand that member information may be received from other types of websites by using request methods corresponding to types of the server 2.

Referring back to FIG. 1, the network interface unit 20 accesses the server 2 storing member information by performing operations as described above and receives member information stored in the server 2.

The list generating unit 50 generates a list of e-mail addresses of the members 4 by using the received member information. The list generating unit 50 generates the list by parsing e-mail addresses of the members 4 from the received member information.

In detail, the list generating unit 50 includes the parsing unit 520, which parses e-mail addresses of the members 4 from member information received based on a format of an e-mail addresses, and the e-mail address generating unit 510, which generates e-mail addresses of the members 4 based on a result of the parsing. The list generating unit 50 generates a list by using the e-mail addresses generated by the e-mail address generating unit 510.

The parsing unit 520 parses the response received from the server 2 as shown in FIGS. 8A and 8B. The response indicates member information. In other words, the parsing unit 520 operates together with the requesting unit 40, parses a response received from the server 2 as a result of a request of the requesting unit 40, and extracts information to be used by the e-mail address generating unit 510 to generate e-mail addresses.

In FIG. 8B, information about an e-mail address of a friend, such as "email":"bigboy@google.com" is shown as a result of the final parsing. The e-mail address generating unit 510 generates e-mail addresses of the members 4 by using e-mail addresses of friends, such as "email":"bigboy@google.com," which is acquired as a result of the parsing.

However, according to types of the server 2, the server 2 may directly store information about e-mail addresses of the members 4, or instead of storing information about e-mail addresses, user IDs of the members 4 to log into the server 2 may be in the form of e-mail addresses. Furthermore, according to types of the server 2, user IDs of the members 4 to log into the server 2 may not be in the form of e-mail addresses. According to an embodiment, a list of e-mail addresses may be generated in any of the cases as stated above.

In detail, the e-mail address generating unit 510 determines whether the parsed member information includes e-mail addresses or not.

If it is determined that the member information includes e-mail addresses, the e-mail address generating unit 510 generates e-mail addresses based on e-mail addresses included in the member information.

However, if it is determined that the member information does not include e-mail addresses, the e-mail address generating unit 510 generates e-mail addresses by using user IDs of the members 4 included in the received member information. In this case, user IDs of the members 4 are either in the form of e-mail address or not in the form of e-mail address.

In this case, the parsing unit 520 parses the response from the server 2, which indicate member information, again. In other words, the parsing unit 520 parses user IDs of the members 4. As a result of parsing the response, if user IDs are in the form of e-mail addresses, the e-mail address generating unit 510 generates e-mail addresses by using the user IDs. If user IDs are not in the form of e-mail addresses, the e-mail address generating unit 510 generates e-mail addresses by using the user IDs and a host name or a domain name of a website provided by the server 2.

Figure 9:
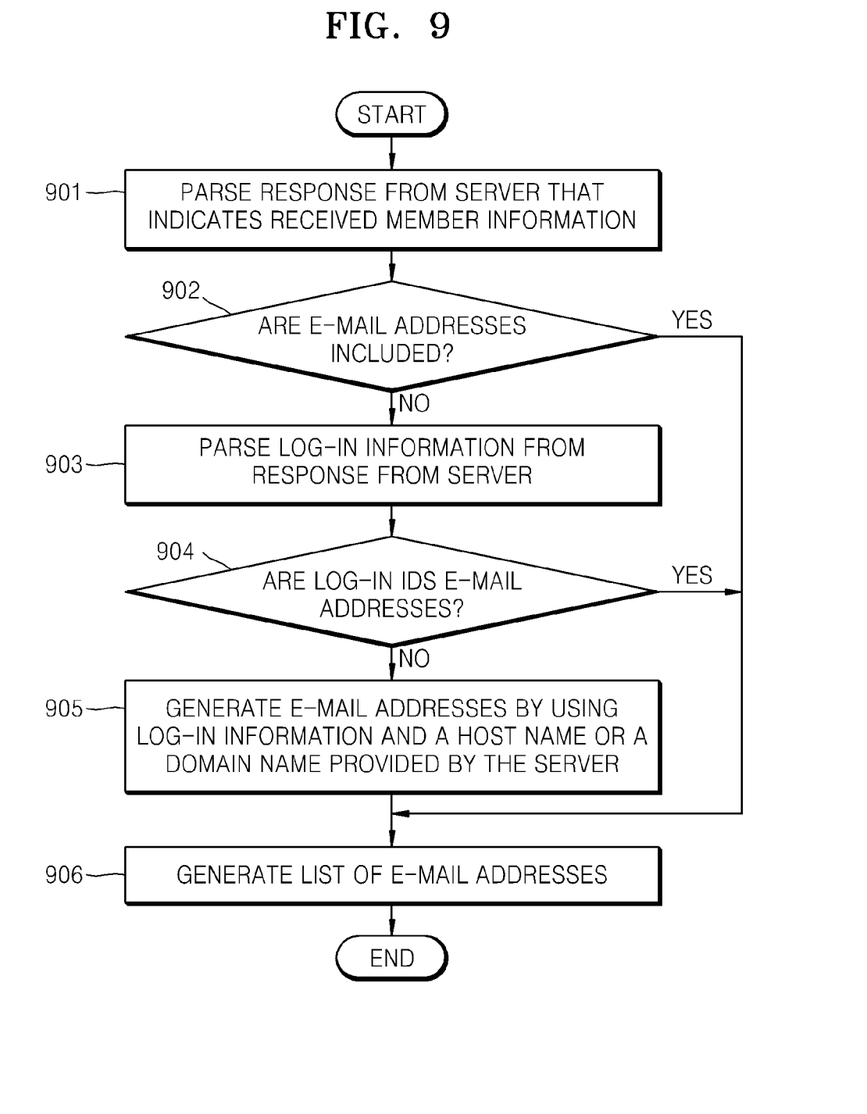
FIG. 9 is a flowchart showing that a list generating unit generates a list of e-mail addresses according to an embodiment.

FIG. 9 is a flowchart showing that the list generating unit 50 generates a list of e-mail addresses according to an embodiment.

In an operation 901, the parsing unit 520 parses a response from the server 2 that indicates received member information.

In an operation 902, the e-mail address generating unit 510 determines whether parsed member information includes e-mail addresses or not. If it is determined that the parsed member information includes e-mail addresses, the process proceeds to an operation 906 in which the e-mail address generating unit 510 generates e-mail addresses based on e-mail addresses included in the member information, and the list generating unit 50 generates a list of e-mail addresses by using the generated e-mail addresses. If it is determined that parsed member information does not include e-mail addresses, the process proceeds to an operation 903.

In the operation 903, the parsing unit 520 parses the response from the server 2, which indicates member information, again. In other words, the parsing unit 520 parses user IDs of the members 4.

In an operation 904, the e-mail address generating unit 510 determines whether the parsed user IDs are in the form of e-mail addresses or not. If the parsed user IDs are in the form of e-mail addresses, the process proceeds to the operation 906, in which the e-mail address generating unit 510 generates e-mail addresses by using the user IDs, and the list generating unit 50 generates a list of e-mail addresses by using the generated e-mail addresses. If the parsed user IDs are not in the form of e-mail addresses, the process proceeds to an operation 905.

In the operation 905, the e-mail address generating unit 510 generates e-mail addresses by using user IDs and a host name or a domain name of a website provided by the server 2, and the list generating unit 50 generates a list of e-mail addresses by using the generated e-mail addresses. Here, the e-mail address generating unit 510 generates e-mail addresses in the form of "User ID@host.domain", for example.

In the operation 906, the list generating unit 50 generates a list of e-mail addresses by using the generated e-mail addresses.

Referring back to FIG. 1, the parsing unit 520 also parses recent date information and favorite information from the response from the server 2. The list generating unit 50 generates a list of e-mail addresses by adding recent date information and favorite information to e-mail addresses. Such recent date information and favorite information refer to information about recently contacted friends, recent e-mail transmission dates recorded in an e-mail history, friends added to a favorite list, etc. and are included in received member information.

Figure 10:
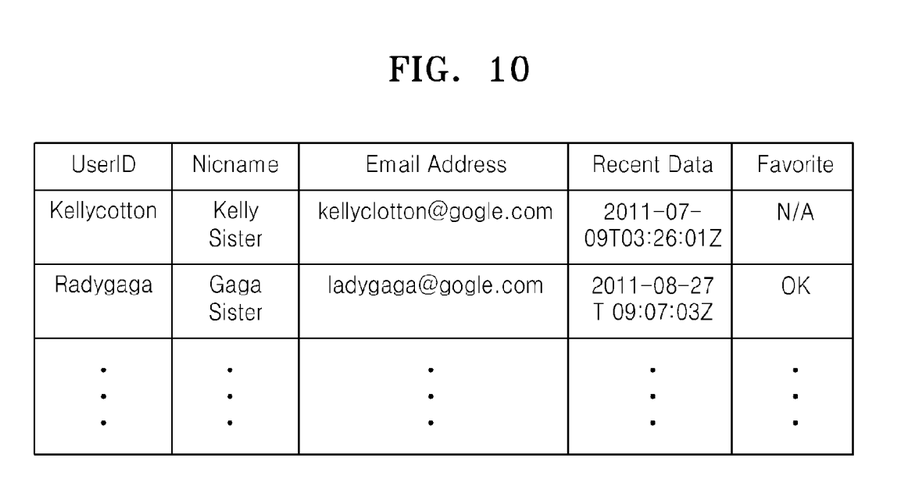
FIG. 10 shows a list of e-mail addresses that is generated by the list generating unit according to an embodiment.

FIG. 10 shows a list of e-mail addresses that is generated by the list generating unit 50 according to an embodiment. Referring to FIG. 10, the list of e-mail addresses includes user ID, a nickname, an e-mail address, a recent date, and favorite information of each of the members 4. However, an embodiment is not limited thereto.

Referring back go FIG. 1, the UI unit 10 displays the list of e-mail addresses generated by the list generating unit 50. The user 3 may select and input desired e-mail addresses in the list of e-mail addresses displayed on the UI unit 10. In other words, the user 3 may select and input e-mail addresses that the user 3 desires to add to an address book stored in the image forming apparatus 1 from the list of e-mail addresses displayed on the UI unit 10.

Here, since the list of e-mail addresses includes recent date information and favorite information as described above, the list of e-mail addresses displayed on the UI unit 10 may be displayed in a particular arrangement, such as an all list, a recent list, a favorite list, etc., according to selection by the user 3.

The updating unit 60 updates the address book stored in the image forming apparatus 1 by using the list of e-mail addresses generated by the list generating unit 50. Here, as described above, the updating unit 60 updates the address book by adding e-mail addresses selected by the user to the address book.

Figure 11:
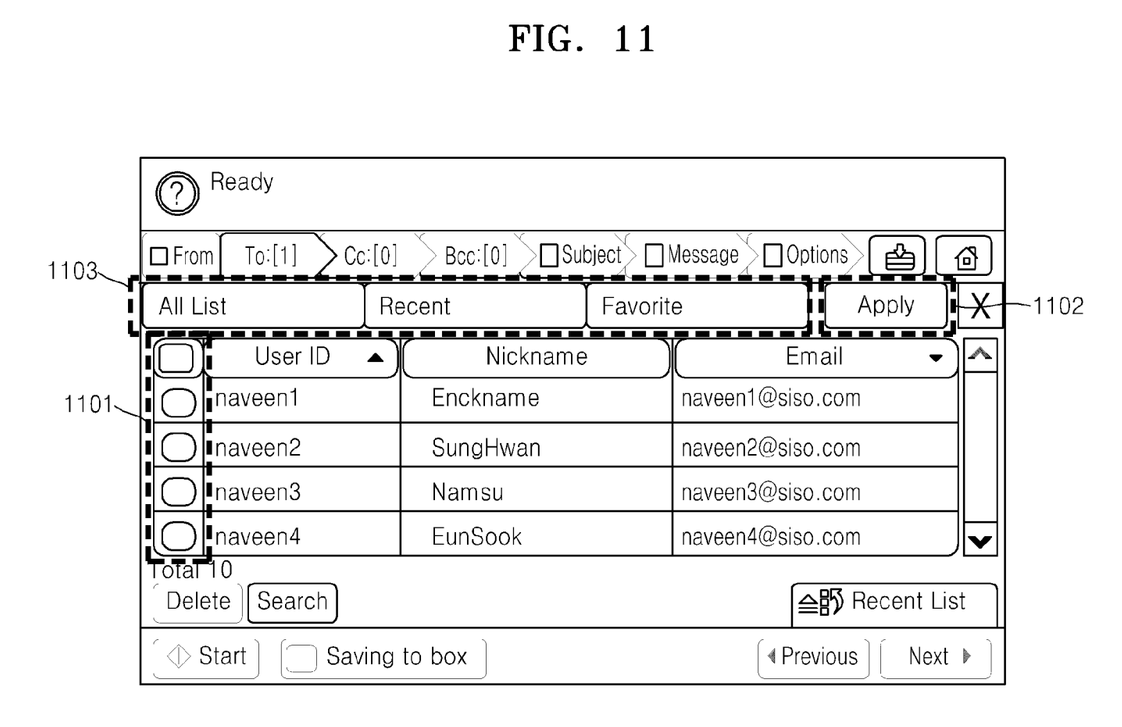
FIG. 11 is a diagram showing a list of e-mail addresses displayed on the UI unit, according to an embodiment.

FIG. 11 is a diagram showing a list of e-mail addresses displayed on the UI unit 10, according to an embodiment.

Referring to FIG. 11, the user may select desired e-mail addresses by clicking a check button 1101 with respect to the desired e-mail addresses and clicking an apply button 1102. When the apply button 1102 is clicked, the updating unit 60 updates an address book by adding the selected e-mail addresses to the address book. Here, the e-mail addresses desired by the user 3 may refer to e-mail addresses to which the user 3 desires to transmit a scanned document by using the Scan-To-Email function or e-mail addresses that the user wants to add to the address book.

Furthermore, the user 3 may select to display the list of e-mail addresses in an arrangement, such as an all list, a recent list, or a favorite list, by using an arrangement button 1103.

Configuration of the screen displayed on the UI unit 10 as shown in FIG. 11 is merely an example, and an embodiment is not limited thereto.

Figure 12:
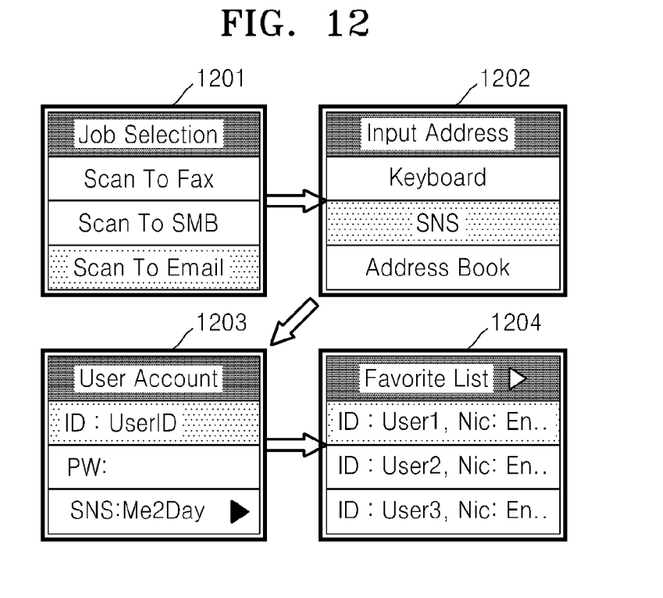
FIG. 12 is a diagram showing a sequence of displaying screens during inputting of e-mail addresses via the UI unit according to another embodiment.

FIG. 12 is a diagram showing a sequence of displaying screens during inputting of e-mail addresses via the UI unit 10 according to another embodiment. Referring to FIG. 12, unlike in the previous embodiments described above, configuration of a screen displayed on the UI unit 10 is simple.

When the user 3 wants to input e-mail addresses by using member information stored in the server 2, the user 3 may input the e-mail addresses by selecting the Scan-To-Email function (operation 1201), selecting an SNS (operation 1202), inputting log-in information and a type of SNS (operation 1203), and selecting desired e-mail addresses (operation 1204) on the screen displayed on the UI unit 10.

Referring back to FIG. 1, the scanning unit 70 generates a scanned image by scanning a document to be transmitted via e-mail. The Scan-To-Email function is a function to transmit a document scanned by the scanning unit 70 via e-mail. The scanning unit 70 is a device having the same functions as a general scanner. Since the process of generating a scanned image by scanning a document is obvious to one of ordinary skill in the art, detailed description thereof will be omitted.

A storage unit (not shown) of the image forming apparatus 1 stores results of processes performed by the components of the image forming apparatus 1. In other words, the storage unit may store a list of generated e-mail addresses. According to an embodiment, a volatile memory may be used to store a list of generated e-mail addresses, so that the list of generated e-mail addresses may be automatically deleted after the e-mail addresses are used.

Figure 13:
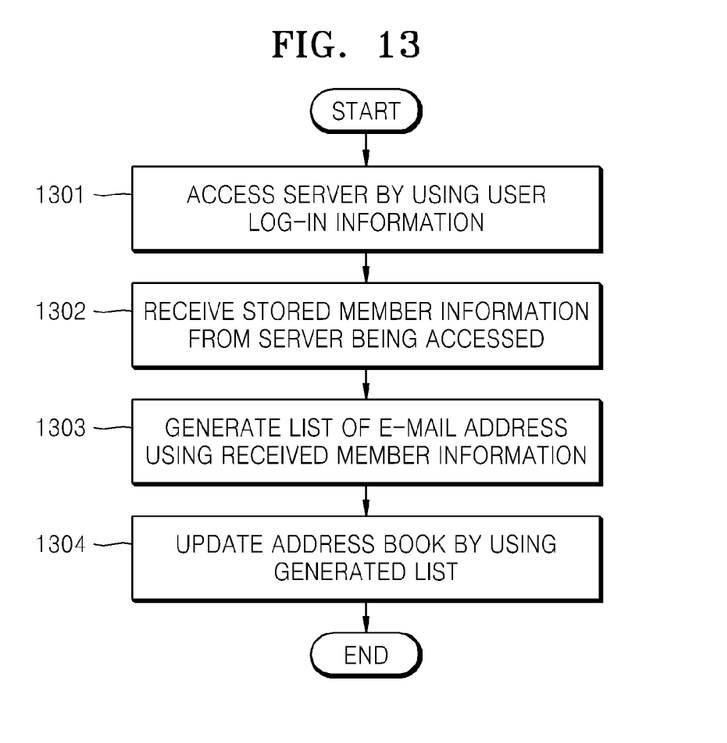
FIG. 13 is a flowchart showing a method of inputting e-mail addresses at the image forming apparatus according to an embodiment.

FIG. 13 is a flowchart showing a method of inputting e-mail addresses at the image forming apparatus 1 according to an embodiment. Referring to FIG. 13, the method of inputting e-mail addresses at the image forming apparatus 1 according to an embodiment includes operations that are chronologically performed at the image forming apparatus 1 as shown in FIGS. 1 and 2. Therefore, even if detailed description is omitted, descriptions given above with respect to the image forming apparatus 1 shown in FIGS. 1 and 2 may also be applied to the method of inputting e-mail addresses at an image forming apparatus according to an embodiment.

In an operation 1301, the network interface unit 20 accesses the server 2, which stores member information about members who have contacted the user 3 online, by using log-in information of the user 3.

In an operation 1302, the network interface unit 20 receives member information stored in the server 2 from the server 2.

In an operation 1303, the list generating unit 50 generates a list of e-mail addresses of the members 4 by using the received member information.

In an operation 1304, the updating unit 60 updates an address book stored in the image forming apparatus 1 by using the generated list of e-mail addresses.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such are read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

While this invention has been particularly shown and described with reference to one or more embodiments thereof, it will be understood by those skilled in the art that various changes in form and details may be made therein without departing from the spirit and scope of the invention as defined by the appended claims. One or more embodiments should be considered in descriptive sense only and not for purposes of limitation. Therefore, the scope of the invention is defined not by the detailed description of the invention but by the appended claims, and all differences within the scope will be construed as being included in the invention.

What is claimed is:

1. A method of inputting e-mail addresses at an image forming apparatus, the method comprising:
    accessing a server providing at least one service of a social network service (SNS), a message service and an e-mail service, by using log-in information of a user for logging-in the server;
    receiving, from the server, member information about members who form an online personal connection with the user logged-in the server;
    generating a list of e-mail addresses of the members by using log-in accounts of the members extracted from the received member information; and
    updating an address book stored in the image forming apparatus by using the list of generated e-mail addresses,
    wherein the generating of the list and the updating of the address book are performed by at least one processor.

2. The method of claim 1, wherein the members further comprises members recorded in an e-mail history of the user.

3. The method of claim 1, wherein in the generating the list of e-mail addresses, e-mail addresses of the members are parsed from the received member information.

4. The method of claim 1, wherein the generating the list of e-mail addresses comprises:
    parsing e-mail addresses of the members from the member information based on a format of an e-mail addresses; and
    generating e-mail addresses of the members by using a result of the parsing the member information, and
    generating the list of e-mail addresses by using the generated e-mail addresses.

5. The method of claim 4, wherein the generating the e-mail addresses comprises determining whether the parsed member information includes e-mail addresses or not, and
    if it is determined that the member information includes e-mail addresses, e-mail addresses are generated based on the included e-mail addresses.

6. The method of claim 5, wherein in the generating the e-mail addresses, if it is determined that the member information does not include e-mail addresses, e-mail addresses are generated by using the log-in accounts of the members included in the received member information.

7. The method of claim 1, further comprising:
    attempting authentication to the server by using the log-in information; and
    if the authentication is successful and connection to the server is established, requesting the stored member information from the server,
    wherein in the receiving the member information, the stored member information is received as a result of the request.

8. The method of claim 7, wherein in the attempting of authentication, the authentication is attempted by using an authentication module that communicates via a protocol corresponding to a type of the server, and
    in the requesting of the member information, the request is made by using a requesting module that communicates via a protocol corresponding to the type of the server.

9. The method of claim 1, further comprising receiving selection of type of the server and log-in information corresponding to the selected server from the user,
    wherein in the accessing the server, the selected server is accessed by using the received log-in information.

10. The method of claim 1, wherein in the generating the list of e-mail addresses, the list of e-mail addresses is generated by adding recent date information and favorite information to the e-mail addresses, and
    the recent date information and the favorite information are included in the received member information.

11. The method of claim 1, wherein in the updating the address book, the address book is updated by adding e-mail addresses selected by the user in the list of generated e-mail addresses to the address book.

12. The method of claim 1, further comprising:
    scanning a document by using the image forming apparatus; and
    transmitting the scanned document to e-mail addresses included in the updated address book.

13. At least one non-transitory computer readable medium comprising computer readable instructions that control at least one processor to implement a method of inputting e-mail addresses at an image forming apparatus, the method comprising:
    accessing a server providing at least one service of a social network service (SNS), a message service and an e-mail service, by using log-in information of a user for logging-in the server;
    receiving, from the server, member information about members who form a online personal connection with the user logged-in the server;
    generating a list of e-mail addresses of the members by using log-in accounts of the members extracted from the received member information; and
    updating an address book stored in the image forming apparatus by using the list of generated e-mail addresses,
    wherein the generating of the list and the updating of the address book are performed by at least one processor.

14. An image forming apparatus comprising:
    a network interface unit that accesses a server providing at least one service of a social network service (SNS), a message service and an e-mail service by using log-in information of a user and receives, from the server, the member information about members who form an online personal connection with the user logged-in the server;

a list generating unit that generates a list of e-mail addresses of the members by using log-in accounts of the members extracted from the received member information; and an updating unit that updates an address book stored in the image forming apparatus by using the list of generated e-mail address.

15. The image forming apparatus of claim 14, further comprising:

a parsing unit that parses e-mail addresses of the members from the member information based on a format of an e-mail addresses; and an e-mail address generating unit that generates e-mail addresses of the members by using a result of the parsing of the member information.

16. The image forming apparatus of claim 14, further comprising:

an authentication unit that attempts authentication to the server by using the log-in information via an authentication module corresponding to the server; and a requesting unit that, if the authentication is successful and connection to the server is established, requests the stored member information from the server via a requesting module corresponding to the server.

17. The image forming apparatus of claim 14, further comprising an interface unit that receives selection of type of the server, log-in information corresponding to the selected server, and selection of e-mail addresses in the list of generated e-mail addresses, to which the user wants to transmit an e-mail, from the user.

18. The image forming apparatus of claim 14, further comprising:

a scanning unit that scans a document by using the image forming apparatus; and a transmitting unit that transmits the scanned document to e-mail addresses included in the updated address book.

* * * * *